US011379633B2

(12) United States Patent
Adolf et al.

(10) Patent No.: US 11,379,633 B2
(45) Date of Patent: Jul. 5, 2022

(54) CASCADING MODELS FOR OPTIMIZATION OF FABRICATION AND DESIGN OF A PHYSICAL DEVICE

(71) Applicant: X Development LLC, Mountain View, CA (US)

(72) Inventors: Brian Adolf, San Mateo, CA (US); Martin Schubert, Mountain View, CA (US); Jesse Lu, Hollister, CA (US)

(73) Assignee: X Development LLC, Mountain View, CA (US)

( * ) Notice: Subject to any disclaimer, the term of this patent is extended or adjusted under 35 U.S.C. 154(b) by 428 days.

(21) Appl. No.: 16/432,538

(22) Filed: Jun. 5, 2019

(65) Prior Publication Data

US 2020/0387577 A1  Dec. 10, 2020

(51) Int. Cl.
*G06F 30/20* (2020.01)
*G05B 19/4097* (2006.01)

(52) U.S. Cl.
CPC .......... *G06F 30/20* (2020.01); *G05B 19/4097* (2013.01); *G05B 2219/35012* (2013.01)

(58) Field of Classification Search
CPC .............. G06F 30/20; G05B 19/4097; G05B 2219/35012
USPC ............................................................ 703/1
See application file for complete search history.

(56) References Cited

U.S. PATENT DOCUMENTS

| 5,774,693 A | 6/1998 | Hsu et al. |
| 6,718,291 B1 | 4/2004 | Shapiro et al. |
| 6,772,076 B2 | 8/2004 | Yamamoto et al. |
| 7,523,429 B2 | 4/2009 | Kroyan et al. |
| 7,546,178 B2 | 6/2009 | Kouno et al. |
| 7,653,890 B2 | 1/2010 | Tsai et al. |
| 9,589,757 B1 | 3/2017 | Hannon et al. |

(Continued)

FOREIGN PATENT DOCUMENTS

| KR | 1020170011554 A | 2/2017 |
| WO | 2017/176370 A1 | 10/2017 |

(Continued)

OTHER PUBLICATIONS

Hassan_2017 (Topology Optimisation of Wideband Coaxial-to-Waveguide Transitions, Scientific Reports 2017). (Year: 2017).*

(Continued)

*Primary Examiner* — Brian S Cook
(74) *Attorney, Agent, or Firm* — Christensen O'Connor Johnson Kindness PLLC

(57) ABSTRACT

A technique for simulating and optimizing the fabrication and design of a physical device is described. The technique includes executing a fabrication simulation of the physical device with a fabrication model that receives a fabrication specification as input and outputs a structural design for the physical device in response to the fabrication simulation. An operational simulation of the physical device is executed with a design model that simulates a field response propagating through a simulated environment of the physical device. The structural design output from the fabrication model is forward cascaded to the design model and an output from backpropagation of a performance loss error through the design model is reverse cascaded to the fabrication model.

25 Claims, 7 Drawing Sheets

(56) References Cited

U.S. PATENT DOCUMENTS

| | | | |
|---|---|---|---|
| 10,223,494 B2 | 3/2019 | Shin et al. | |
| 2004/0225483 A1 | 11/2004 | Okoniewski et al. | |
| 2005/0235246 A1 | 10/2005 | Smith et al. | |
| 2010/0312539 A1 | 12/2010 | Yamagajo et al. | |
| 2014/0365188 A1 | 12/2014 | Doerr | |
| 2016/0012176 A1 | 1/2016 | Liu et al. | |
| 2016/0033765 A1 | 2/2016 | Liu et al. | |
| 2016/0174902 A1 | 6/2016 | Georgescu et al. | |
| 2017/0148226 A1 | 5/2017 | Zhang et al. | |
| 2017/0345140 A1 | 11/2017 | Zhang et al. | |
| 2017/0351952 A1 | 12/2017 | Zhang et al. | |
| 2018/0018757 A1 | 1/2018 | Suzuki | |
| 2018/0032662 A1 | 2/2018 | Adel et al. | |
| 2018/0045953 A1* | 2/2018 | Fan | G02B 5/18 |
| 2018/0075581 A1 | 3/2018 | Shi et al. | |
| 2019/0155254 A1* | 5/2019 | Runkle | B33Y 50/02 |

FOREIGN PATENT DOCUMENTS

| | | | |
|---|---|---|---|
| WO | 2017/223560 A1 | 12/2017 | |
| WO | 2018/184187 A1 | 10/2018 | |
| WO | WO-2019006076 A1 * | 1/2019 | C23C 14/042 |

OTHER PUBLICATIONS

Lalau-Keraly_2013 (Adjoint Shape Optimization Applied to Electromagnetic Design, 2013 Optical Society of America) (Year: 2013).*

International Search Report and Written Opinion, dated Aug. 27, 2020, for International Patent Application No. PCT/US2020/033930, 11 pages.

Chen, R.T. et al., "Neural Ordinary Differential Equations", 32nd Conference on Neural Information Processing Systems (NIPS 2018), Oct. 22, 2018, 18 pages.

Petykiewicz, J. et al., "Active Nanophotonics: Inverse Design and Strained Germanium Light Emitters", A Dissertation Submitted to the Department of Electrical Engineering and the Committee on Graduate Studies of Stanford University, Oct. 2016. 134 pages.

Ying-Shou Lu, J., "Nanophotonic Computational Design", A Dissertation Submitted to the Department of Electrical Engineering and the Committee on Graduate Studies of Stanford University, Jun. 2013, 122 pages.

Piggott, A.Y., "Automated Design of Photonic Devices", A Dissertation Submitted to the Department of Electrical Engineering and the Committee on Graduate Studies of Stanford University, Jun. 2018, 112 pages.

Lu, J. et al., "Nanophotonic Computational Design", Optics Express, vol. 21, No. 11, Jun. 3, 2013, 17 pages.

Piggott, A. Y. et al., "Inverse Design and Implementation of a Wavelength Demultiplexing Grating Coupler", Scientific Reports, Nov. 27, 2014, 5 pages.

Piggott, A.Y. et al., "Inverse Design and Demonstration of a Compact and Broadband On-Chip Wavelength Demultiplexer", Nature Photonics, May 11, 2015, 5 pages.

Piggott, A.Y. et al., "Silicon Photonics: Design Approach to Integrated Photonics Explores Entire Space of Fabricable Devices", Laser Focus World, Aug. 13, 2018, 5 pages.

Piggott, A. Y. et al., "Fabrication-constrained Nanophotonic Inverse Design", Scientific Reports, May 11, 2017, 7 pages.

Su, L. et al., "Inverse Design and Demonstration of a Concept On-Chip Narrowband Three-Channel Wavelength Demultiplexer", ACS Photonics, Aug. 17, 2017, 6 pages.

Su, L. et al., Fully-Automated Optimization of Grating Couplers, Optics Express, vol. 26, No. 4m Feb. 2018, 12 pages.

Robinson, J.T., "First-Principle Derivation of Gain in High-Index-Contrast Waveguides", Optics Express, vol. 16, No. 21, Oct. 13, 2008, 11 pages.

Lalau-Keraly, C.M. et al., "Adjoint Shape Optimization Applied to Electromagnetic Design", Optical Society of America, 2013, 9 pages.

Odajima, W. et al., "Application Examples of Electromagnetic Wave Simulation Software 'Poynting' in Manufacturing Industry", Fujitsu Std. Tech. vol. 50, No. 3, 2014, 81 pages.

Isola, P. et al., "Image-to-Image Translation with Conditional Adversarial Networks", arXiv:1611.07004 [cs.CV], Nov. 22, 2017, 17 pages.

Zhu, Jun-Yan et al., "Unpaired Image-to-Image Translation using Cycle-Consistent Adversarial Networks", arXiv:1703.10593 [cs.CV], Aug. 30, 2018, 18 pages.

Dumoulin, V. et al., "Generative Adversarial Networks: An Overview", arXiv:1710.07035 [cs.CV], Oct. 19, 2017, 14 pages.

Goodfellow, I.J., et al., "Generative Adversarial Nets", NIPS Proceedings, 2014, 9 pages.

Horvath, R. et al., "Analytical Theory of Grating Couplers for Waveguide Sensing: A Perturbational Approach and its Limitations", Brown University, 2004, 32 pages.

Athena Process Simulation Framework, Silvaco, Dec. 2018, 4 pages.

Atlas—Device Simulation Framework, Silvaco, Oct. 23, 2018, 16 pages.

Discussion today: Grating couplers, Berkeley University, E232 Discussion, Feb. 16, 2017, 26 pages.

Hesse, C., "Image-to-Image Translation in Tensorflow—Affine Layer", Retrieved from Internet: <https"//affinelayer.com/pix2pix/>, Jan. 25, 2017 11 pages.

Shrivastava, A., "Learning from Simulated and Unsupervised Images through Adversarial Training", arXiv:1612.07828 [cs.CV], Nov. 15, 2016, 16 pages.

"3D Inviscid Inverse Design Code Applicable to All Types of Axial, Mixed Flow and Radial Turbomachinery", Advanced Design Technology, Inc., 2016, 2 pages.

Shibuya, N., "Understanding Generative Adversarial Networks—Toward Data Science", Retrieved from Interbet: <https://towardsdatascience.com/understanding-generative-adversarial-networks-4dafc963f2ef> Oct. 24, 2018, 11 pages.

Victory Process—3D Process Simulator, Silvaco, Nov. 5, 2018, 5 pages.

Victory Process—3D Process Simulator, Silvaco, Nov. 5, 2018, 12 pages.

Zili, Y. et al., "DualGAN: Unsupervised Dual Learning for Image-to-Image Translation", arXiv:1704.02510 [cs.CV], Oct. 9, 2018, 9 pages.

* cited by examiner

CASCADING MODELS FOR OPTIMIZATION OF FABRICATION AND DESIGN OF A PHYSICAL DEVICE

TECHNICAL FIELD

This disclosure relates generally to fabrication and design optimization of physical devices, and in particular, but not exclusively, to inverse design techniques.

BACKGROUND INFORMATION

Electromagnetic devices (e.g., optical devices, electrical devices, or otherwise) are devices that create, manipulate, propagate, and/or measure electromagnetic radiation. Their applications vary broadly and include, but are not limited to, acousto-optic modulators, optical modulators, optical ring resonators, distributed Bragg reflectors, lasers, lenses, transistors, waveguides, antennas, and the like. Conventional techniques for the design of these devices are sometimes determined through a simple guess and check method in which a small number of design parameters of a predetermined design are adjusted for suitability to a particular application. However, in actuality, these devices may have design parameters ranging from hundreds all the way to many billions, dependent on the device size and functionality. As functionality of electromagnetic devices is increased and manufacturing tolerances improve to allow for smaller device feature sizes, it becomes increasingly important to take full advantage of these improvements via optimized device design and fabrication.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
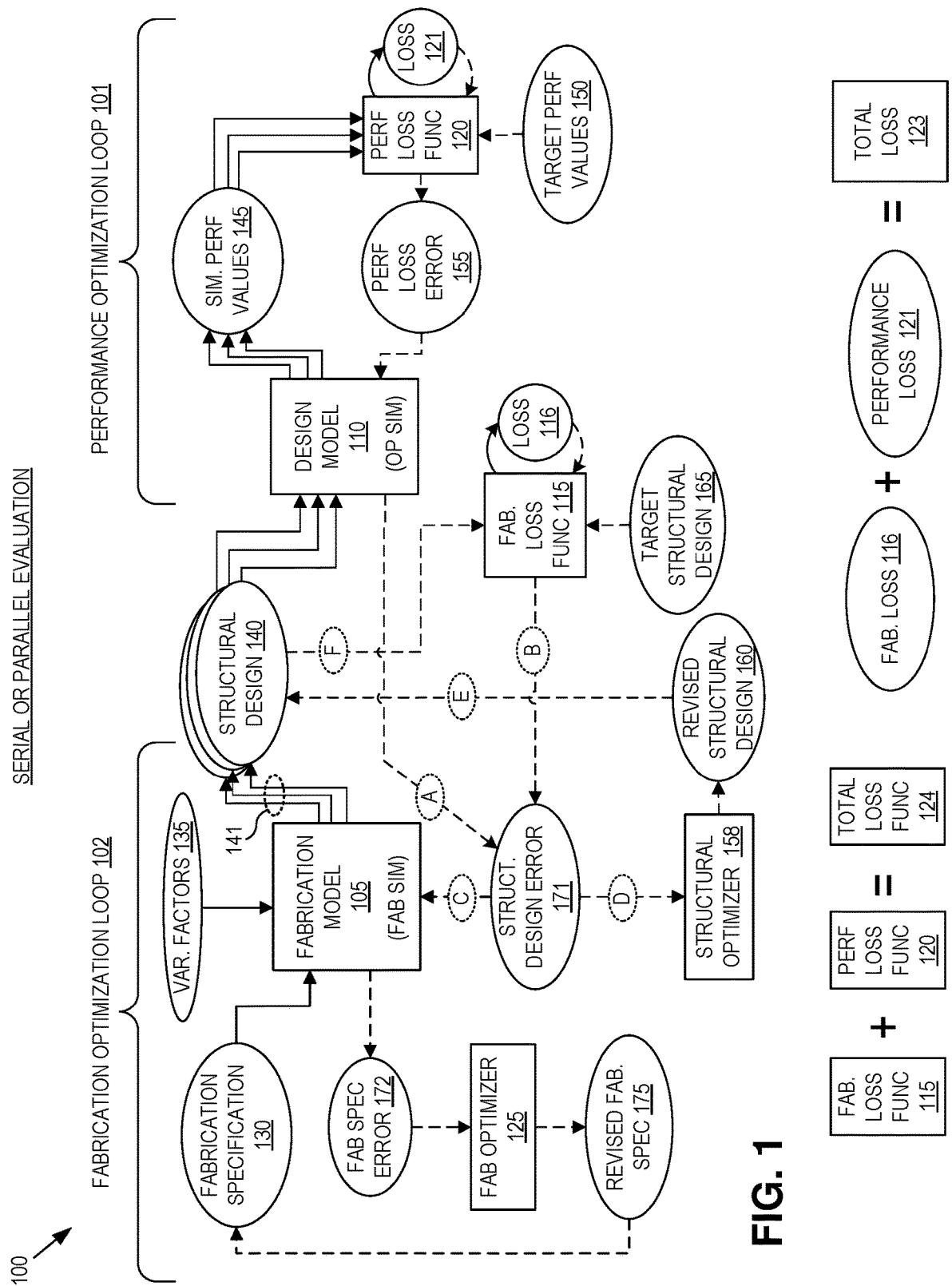
FIG. 1 is a functional block diagram illustrating an evaluation architecture including a fabrication model cascaded with a design model, in accordance with an embodiment of the disclosure.

Embodiments of a system, apparatus, and method for the simulation and optimization of both a fabrication specification and/or a design specification for a physical device using cascaded fabrication and design models are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The design and optimization of physical devices, such as electromagnetic devices (e.g, antennas, waveguides, etc.), photonic devices (e.g., lasers, LEDs, waveguides, etc.), fluidic devices, or acoustic devices, can be approached as an inverse problem where a designer provides a target specification and then determines a design that satisfies it. This target specification can be formalized and explicitly described in terms of a loss function L, where the convention $L \leq 0$ signifies that the target performance/fabrication parameters have been achieved. The inverse problem, then, consists of finding a structural design z or fabrication process f, which satisfies $L \leq 0$. In contrast, the corresponding "forward problem" is one where the performance of a given design, relative to the target specification, needs to be determined for a given design.

Described herein is a methodology to the inverse problem for the design and fabrication of a physical device. The methodology includes directly cascading a fabrication model that executes a differentiable fabrication simulation with a design model that executes a differentiable (and possibly reversible) operational simulation for the physical device. In other words, the design model provides an operational simulation in which the operational physics of a given structural design may be simulated. The fabrication model provides a fabrication simulation in which the fabrication specification for building the structural design may be simulated. The techniques described herein for cascading multiple models (e.g., fabrication and design models) may also be extended to cascading other types of models, such as installation models, to build designs that are robust to common installation errors.

In order to optimize a given structural design for certain performance parameters using inverse methods, a derivative of the performance objective function (the loss function L) with respect to the structural properties z (e.g., material properties) is defined as a function of location in space. This can be done in a fully differentiable and reversible way, if the physics governing the performance parameters are well defined, as in Maxwell's equations for electromagnetics. Embodiments described herein take the inverse design methodology a step further, considering not just the material properties, or presence/absence thereof, that define/describe a physical device to be built, but also considering the fabrication or manufacturing processes that produce the structural design and material properties. In the example of silicon photonic devices, this means having a fully differentiable model of the photolithography process, such as growing material layers (e.g., deposition), masking, etching, etc. In the example of machined physical devices, such as a 2.5D CNC machining process to produce a waveguide, this means generating a differentiable model of the milling process, whereby material is removed according to toolpaths and tool selection. Modelling of the milling process can include mathematical expressions describing backlash, finite control precision, etc. Using a differentiable model of these fabrication processes enables the gradient or derivative of a performance parameter to be propagated even further back, not just to the material values (i.e., structural design), but all the way back to the more fundamental fabrication processes (e.g., photolithography, CNC toolpath, etc.) that create the material values when building up the physical device.

Embodiments described herein contemplate an inverse design and fabrication technique that cascades a fabrication model for executing a fabrication simulation with a design model for executing an operational simulation (also referred to as a physics simulation). In one embodiment, both models are differentiable (and in some cases reversible meaning that if an input is provided to the model, an output can be obtained, and if you have the output, you can get back to the input again). For example, if a perturbation is provided at the output, it can be propagated backwards to see what the corresponding perturbation of the input should be. Even more so, by cascading the design model with a fabrication model, the perturbation at the output of the design model may be propagated even further back than the input to the design model, but rather all the way back to changes or perturbations in the fabrication specification. In other words, embodiments described herein facilitate end-to-end inverse design starting with recitation of one or more target performance parameters (e.g., output power in a particular waveguide mode in the example of the design and fabrication of a waveguide) and ending with the fabrication specification that may specify the control input to a milling machine for fabricating a physical device capable of achieving the target performance parameters.

FIG. 1 is a functional block diagram illustrating an evaluation architecture 100 that cascades a fabrication model 105 with a design model 110, in accordance with an embodiment of the disclosure. The illustrated embodiment of evaluation architecture 100 includes fabrication model 105, design model 110, fabrication loss function 115, a fabrication loss value 116, performance loss function 120, a performance loss value 121, a fabrication optimizer 125, a fabrication specification 130, variability factors 135, structural design(s) 140, simulated performance parameter(s) 145, target performance parameter(s) 150, a performance loss error 155, a structural optimizer 158, a revised structural design 160, a target structural design 165, a structural design error 171, a fabrication specification error 172, and a revised fabrication specification 175.

Fabrication model 105 represents simulation logic configured with a particular fabrication specification 130 to execute a fabrication simulation that simulates the steps and procedures for building a physical device. The output of fabrication model 105 is structural design 140, which is a description of the material structure of the physical device. In some embodiments, structural design 140 may additionally include or itemize one or more fabrication parameters such as yield, cost, manufacturing time, etc. Alternatively, these fabrication parameters may instead be derivable from structural design 140. Fabrication model 105 may include a proprietary or commercially available CAD program for simulating device fabrication using one or more fabrication tools, such as 2.5D CNC tool, lithography tools (e.g., deposition chambers, etching bathes, photolithography tools, masking tools, etc), or otherwise. Fabrication model 105 is a mathematical model that represents these fabrication procedures in a differentiable (and possibly reversible) manner. In one embodiment, fabrication model 105 may be based upon a computational lithography approach, in the example where photolithography fabrication procedures are being modeled. Fabrication model 105 may further characterize any number of statistical or variability factors 135, such as backlash, finite control precision, pressure and temperature deviations, etc., which lead to variability in the output structural designs 140. This variability is represented in FIG. 1 via ensemble 141 of structural designs 140. In some embodiments, fabrication model 105 includes heuristics to account for line widths, minimum radiuses of curvature, or other fabrication limits.

The differentiable nature of fabrication model 105 facilitates backpropagation of structural design error 171 through fabrication model 105. Structural design error 171 represents a multivariable error term that describes the differences (e.g., loss or error) between a simulated structural design (e.g., structural design 140) and a target structural design (e.g., target structural design 165). In one embodiment, structural design error 171 includes structural gradients output from design model 110 (path A) as a result of backpropagating performance loss error 155 through design model 110. In another embodiment, structural design error 171 is generated by fabrication loss function 115 based upon comparing structural design 140 to target structural design 165 (path B). Again, structural design error 171 may still include structural gradients output from fabrication loss function 115, which are backpropagated through fabrication model 105. In contrast to the multivariable nature of structural design error 171, fabrication loss value 116 is a scalar value (e.g., mean squared difference of the structural design error terms) used to evaluate the success of each fabrication or structural optimization iteration.

In yet another embodiment, the structural gradients from both paths A and B may be combined in a weighted manner to generate structural design error 171 as a weighted combined loss error from both paths A and B. Accordingly, paths A and B are not mutually exclusive paths. Taking weighted combinations of the errors output from fabrication loss function 115 and design model 110 enables penalizing for certain fabrication parameters (e.g., individual process steps, tool selection, material selection, cost, yield, variability, etc.) to reduce fabrication loss value 116 while also reducing performance loss value 121. For example, the number of fabrication steps, fabrication cost, etc. may be derived from structural design 140 while the yield and fabrication time may be derived from ensemble 141 of structural designs 140 (discussed in further detail below). The errors associated with these fabrication parameters are backpropagated through fabrication model 105 to generate a fabrication specification error 172. Fabrication specification error 172 includes various gradients of these fabrication parameters computed using a program, such as TensorFlow available from Google Inc. Fabrication optimizer 125 executes an optimization algorithm (e.g., a gradient descent algorithm) on these fabrication gradients to iteratively reduce fabrication loss value 116 and/or performance loss value 121 and generate a revised fabrication specification 175. While structural design error 171 may include gradients (e.g., structural gradients) that provide sensitivity measures to changes in the structure of the design, fabrication specification error 172 may include gradients (e.g., fabrication gradients) that provide sensitivity measures to changes in the fabrication procedures used to fabricate the structural design.

Design model 110 represents simulation logic configured with structural design 140 to establish a virtual or simulated environment that not only describes the structure of the physical device in N-dimensional space (e.g., 3D space) but also simulates the physics underlying its operation. In one embodiment, the simulated environment established within design model 110 is based upon an array of voxels that each describe the material properties at a given location in N-dimensional space. The structure of the physical device is defined by structural design 140 when loaded into the virtual testbed of design model 110. However, this virtual testbed also includes operational logic for calculating and propagating a field response to an excitation source. For example, the operational logic may execute a finite-difference time-domain (FDTD) method to calculate and propagate the field response through the simulated environment. Design model 110 is a mathematical model that represents the structure of the physical device and simulates its operation (e.g., the propagation of field responses) in a differentiable and reversible manner.

The output of design model 110 is a simulated field response at an output region (e.g., output ports) after some number of simulation steps. Specific performance parameters of this output field response may be selected as parameters of interest and are referred to as simulated performance parameter(s) 145. Simulated performance parameters 145 are used by performance loss function 120 to calculate performance loss value 121, which may be a scalar value (e.g., mean square difference between simulated performance values 145 and target performance values 150). For example, in the example of a waveguide, simulated performance parameters 145 may be the simulated field response values at the output needed for calculating optical power, in a specific wavelength band and specific waveguide mode.

Although the present application describes evaluation architecture 100 with reference to fabricating and operationally simulating physical devices that propagate electromagnetic fields, other types of physical devices that propagate other types of fields may also be simulated. For example, physical devices that propagate fluidic or acoustic waves may also be simulated since equations describing the propagation of these fields/waves are well known.

The differentiable nature of design model 110 enables backpropagation, via an adjoint simulation, of performance loss error 155 back through the simulated environment. In one embodiment, performance loss error 155 is calculated based upon a defined performance loss function 120, which compares simulated performance parameters 145 to target performance parameters 150 (i.e., the desired results). Performance loss error 155 itself is a multivariable error term that represents the losses between a simulated performance and a designed performance. Performance loss error 155 is backpropagated through design model 110 during the adjoint simulation to generate structural design error 171 at its input. In one embodiment, performance loss error 155 includes gradients (e.g., loss gradients), which are backpropogated. Backpropagation of performance loss error 155 facilitates the computation of additional performance gradients, such as structural gradients that represent the sensitivity of performance loss value 121 to changes in the structural material properties of the physical device. These gradients are output as structural design error 171 (path A), which may then be used by structural optimizer 158 to perform an iterative gradient descent (e.g., stochastic gradient descent) that optimizes or refines structural design 140 to generate revised structural design 160 (path D). Alternatively (or additionally) the structural gradients generated during the adjoint operational simulation may be directly cascaded back to fabrication model 105 (paths A and C) as well as being used by structural optimizer 158 (path D). The revised structural design 160 output from structural optimizer 158 may be used by design model 110 to iterate performance optimization loop 101 (along paths A, D, and E) and/or by fabrication loss function 115 to iterate fabrication optimization loop 102 (along paths F, B, and C).

As illustrated in FIG. 1, fabrication model 105 is cascaded with design model 110. In FIG. 1, fabrication model 105 and design model 110 are forward cascaded such that forward simulation results (e.g., structural design 140) output from fabrication model 105 may be input into design model 110. Correspondingly, fabrication model 105 and design model 110 are reverse cascaded such that the output from design model 110 may be backpropagated (via paths A and C) directly through fabrication model 105 as structural design error 171, or indirectly via structural optimizer 158 and fabrication loss function 115 (via paths A, D, E, F, B, then C). As mentioned, the results of the fabrication backpropagation may be used to calculate fabrication gradients that represent sensitivity measures of fabrication steps on a fabrication loss value 116. However, it should be further appreciated that the gradients output from both design model 110 and fabrication model 105 may be combined (e.g., weighted combination) to compute sensitivity measures that also relate changes in fabrication parameters to performance loss function 121. In other words, the fabrication gradients may be used by fabrication optimizer 125 to revise or optimize fabrication specification 130 to not only improve the fabrication and design of the physical device (e.g., structural design 140) but also improve the operational performance of the physical device (e.g., simulated performance parameters 145), thus providing an end-to-end fabrication, design, and performance optimization. In one embodiment, fabrication optimizer 125 executes a gradient descent algorithm to generate revised fabrication specification 175, representing a refinement or optimization of the previous fabrication specification 130.

Figure 2:
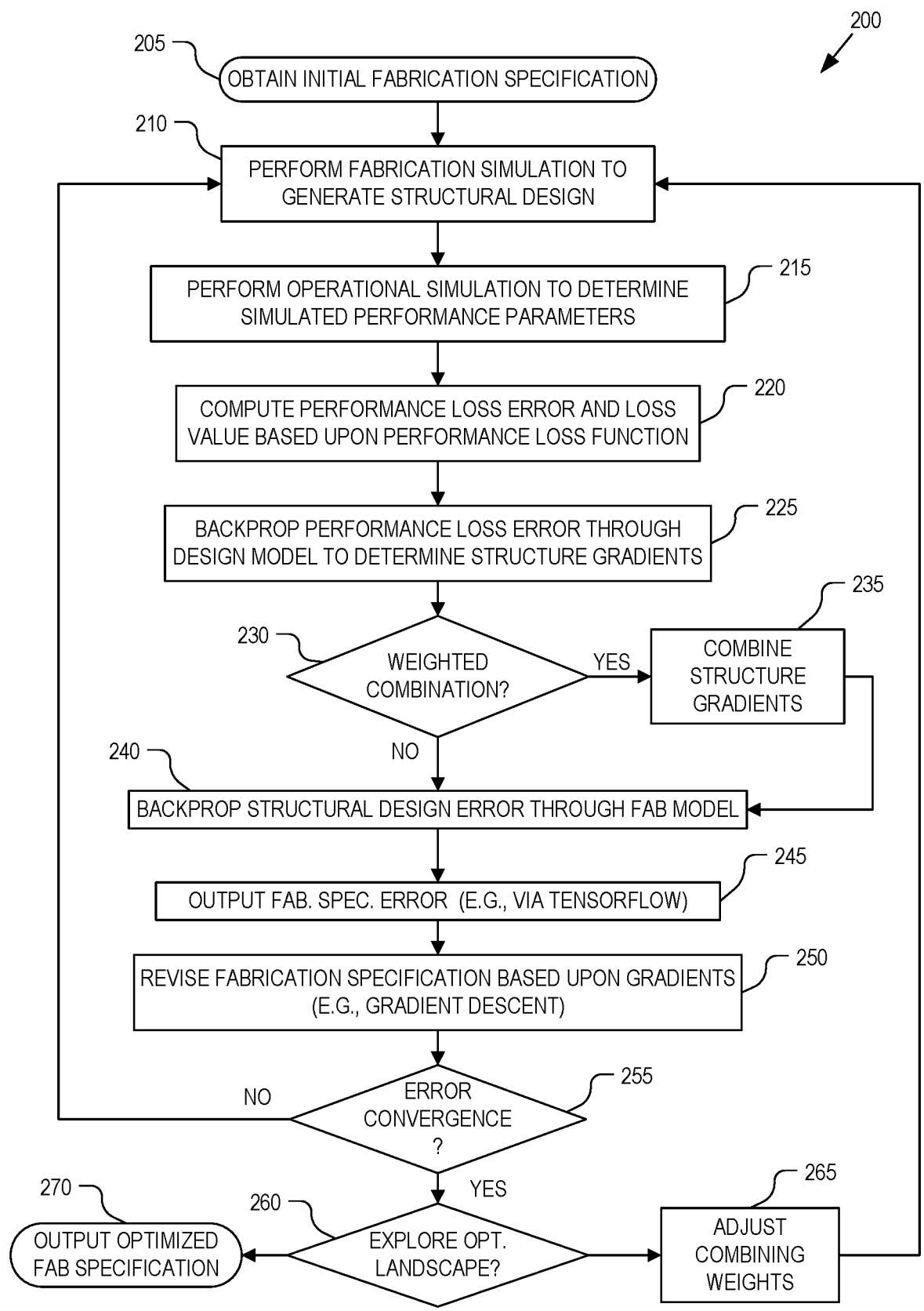
FIG. 2 is a flow chart illustrating operation of cascaded fabrication and design models for optimizing both the fabrication and structural design of a physical device, in accordance with an embodiment of the disclosure.

FIG. 2 is a flow chart illustrating a process 200 for operation of evaluation architecture 100, in accordance with an embodiment of the disclosure. The order in which some or all of the process blocks appear in process 200 should not be deemed limiting. Rather, one of ordinary skill in the art having the benefit of the present disclosure will understand that some of the process blocks may be executed in a variety of orders not illustrated, or even in parallel.

In a process block 205, an initial fabrication specification 130 is obtained and loaded to configure fabrication model 105. Fabrication specification 130 may include designer files that are turned into optical masks (e.g., Gerbers or equivalent), toolpath descriptors (e.g., G code or equivalent), or a variety of other designer file types for specifying the fabrication process flow. As mentioned above, fabrication specification 130 may describe fabrication procedures for photolithography steps, milling steps, or a variety of fabrication technologies.

Once fabrication specification 130 is used to setup and configure fabrication model 105, a fabrication simulation may be executed in process block 210. The fabrication simulation virtualizes the fabrication process, abiding by the real-world physics and constraints of the given fabrication tool/environment. The output of the fabrication simulation is a structural design 140 representing a design iteration of the physical device. In one embodiment, various real-world statistical or variability factors 135 may be accounted for during the fabrication simulation. These variability factors 135 may include statistical deviations associated with manufacturing processes, such as backlash, finite control precision (including pressure deviations, temperature deviations, motor controls, optical resolutions, etc.). As such, the output of fabrication simulation may not simply be a single fixed structural design 140, but rather an ensemble 141 of structural designs 140 that cover a range of structural designs resulting from variability factors 135. Correspondingly, design model 110 may also introduce variability (e.g., different temperatures, stresses, input misalignment, wavelengths, etc.) such that an ensemble of field responses are generated for ensemble 141 of structural designs 140.

In a process block 215, structural design 140 is loaded into design model 110 to configure its simulated environment for an operational simulation. The operational simulation is a physics-based simulation of a field response propagating through the simulated environment. The operational simulation determines the field response at each voxel in N-dimensional space, for each time step of the operational simulation, as the field response propagates outward from one or more excitation sources. The field response values calculated for each time step may then be used to compute a field gradient (e.g., partial derivative of the response field over a partial derivative of the structure), as discussed below. Additionally, simulated performance parameter(s) 145 are extracted from the field response calculated for a designated time step (e.g., final time step) of the operational simulation at a designated region (e.g., output region). Simulated performance parameter(s) 145 may include parameters of interest for benchmarking the current iteration of structural design 140. Such parameters of interest may include, for example, output power in a particular waveguide mode.

In a process block 220, performance loss function 120 is used to compare simulated performance parameter(s) 145 to target performance parameter(s) 150 to generate performance loss value 121 and calculate performance loss error 155 for the adjoint operational simulation. For example, performance loss function 120 may take a mean squared differences between particular parameters of interest in simulated performance parameter(s) 145 and target performance parameter(s) 150 to generate performance loss value 121. In one embodiment, performance loss value 121 is a scalar value. Performance loss error 155 may be a loss gradient that is backpropagated during the adjoint operational simulation. As the structural design 140 approaches a refined or optimal design, the error between simulated performance parameter(s) 145 and target performance parameter(s) 150 should be reduced, thereby reducing the performance loss value 121.

In general, performance loss error 155 is characterized in a format that resembles a field response, and as such, may be reintroduced into design model 110 for backpropagation during the adjoint operational simulation. In a process block 225, performance loss error 155 is backpropagated through design model 110 from the output region to the input region through the simulated environment of the physical device. The result of the adjoint operational simulation may include a number of values of interest referred generically as performance gradients. For example, the adjoint operational simulation may be used to backpropagate the loss gradient and compute a structural gradient (e.g., partial derivative of the loss error over a partial derivative of the structure). The loss gradient and structural gradient, along with the field gradient from the time-forward operational simulation, represent sensitivity metrics that may be used for refining structural design 140 via a gradient descent algorithm. The field gradient and the loss gradient are combined to generate the structure gradient. The structure gradient is a function that relates a change in performance loss error 155 to a change in a structural parameter of structural design 140.

In decision block 230, if the structural gradients output from the adjoint simulation of design model 110 are to be cascaded directly back to fabrication model 105 (along paths A and C), then process 200 continues to a process block 240. However, if structural design error 171 is to be generated as a weighted combination of errors from both performance loss function 120 and fabrication loss function 115, then process 200 continues to a process block 235. In process block 235, fabrication loss function 115 generates a first contribution of structural design error 171 (path B) based upon a comparison of structural design 140 against target structural design 165. This first contribution is then combined with a second contribution directly from design model 110 (path A) to generate a total structural design error 171 that is a weighted combination of both portions. In one embodiment, combining logic (not illustrated) that applies scalable coefficients may generate the weighted combination. Using a weighted combination of backpropagation sources enables the inclusion of both fabrication penalty measures and performance penalty measures in structural design error 171. For example these penalties may account for fabrication centric parameters, such as, yield, cost, fabrication time, number of fabrication steps, particular materials that are scarce or costly, particular fabrication steps, etc., in addition to, the performance parameters, such as power output. By using a weighted combination, the relative importance of these fabrication/performance parameters can be adjusted, as desired. The structural design error 171 is then backpropagated through fabrication model 105 (process block 240) to output fabrication specification error 172 (process block 245). As mentioned, the fabrication specification error includes fabrication gradients, which represent sensitivity measures of changes to a particular parameter of interest on performance loss value 121 and/or fabrication loss value 116. For example, a fabrication gradient may represent a sensitivity measure of a particular fabrication step (e.g., fabrication parameter) on fabrication loss value 116 and/or performance loss value 121. In one embodiment, the fabrication and performance gradients are computed during the adjoint operational simulation and the fabrication backpropagation using a tensor processing unit and dataflow programming utility, such as TensorFlow available from Google Inc.

With the fabrication gradients determined, fabrication optimizer 125 may execute a gradient descent optimization to generate a revised fabrication specification 175, which optimizes some fabrication characteristic or parameter over the previous iteration of fabrication specification 130 (process block 250). Process blocks 205 through 250 represent a single optimization iteration of revising fabrication specification 130 based upon the gradients computed in the current round of adjoint operational simulation and fabrication backpropagation. Because the performance values of interest are backpropagated all the way from performance loss function 120 through design model 110 (in the form of performance loss error 155) and through fabrication model 105 (in the form of the structural design error 171) to fabrication optimizer 125, each optimization iteration represents an end-to-end optimization that determines updated fabrication procedures for reducing at least the performance loss value 121.

In decision block 255, the forward end-to-end simulations along with their corresponding end-to-end gradient backpropagation operations continue to iterate until performance loss value 121 converges or converges within a threshold value. Once convergence has been deemed achieved, process 200 continues to a decision block 260. In decision block 260, it is determined whether the optimization landscape is to be further explored. Exploration of the optimization landscape includes adjusting the chronological order of applying and ramping on the combining weights used to combine different fabrication parameters or structural parameters (process block 265). When process 200 is executed to determine optimized values for fabrication parameters and/or structural parameters that result in a reduced performance loss value 121 or reduced fabrication loss value 116, these optimizations can converge into a local minimum, despite the existence of other minima that can further reduce the loss values.

Figure 3:
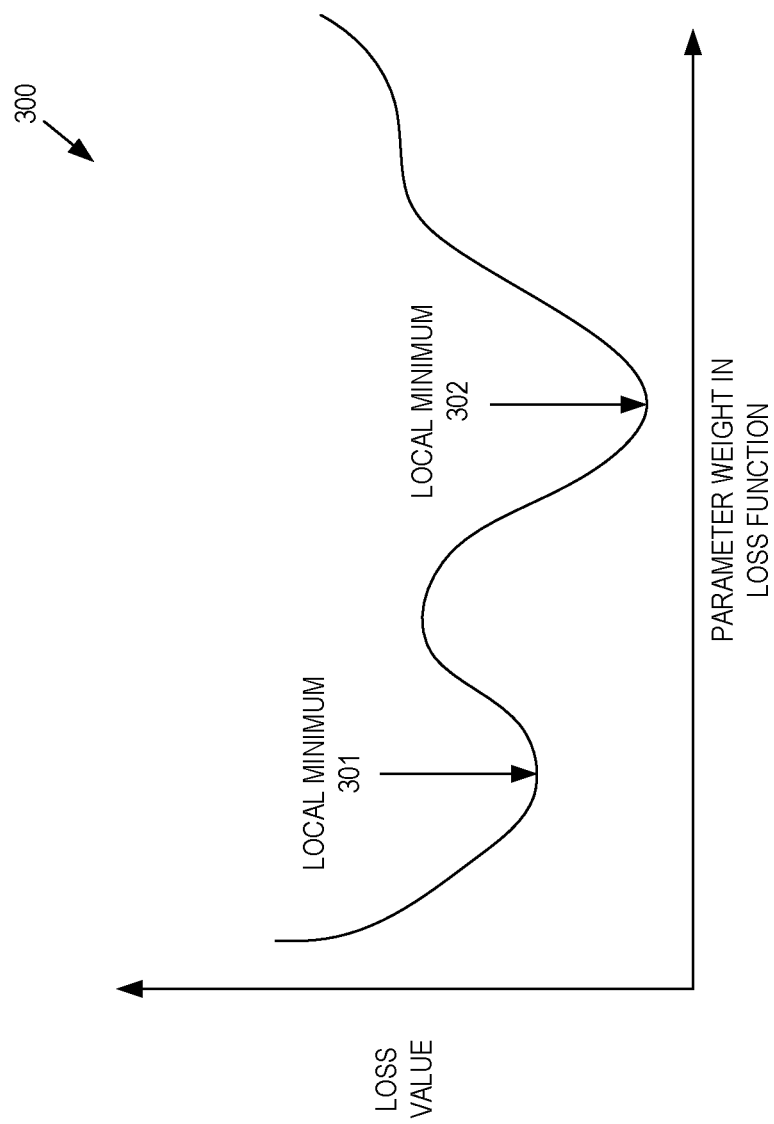
FIG. 3 is a chart illustrating multiple local minima in an optimization landscape, in accordance with an embodiment of the disclosure.

FIG. 3 is an optimization curve 300 that illustrates this local minimum convergence issue. The weights applied to various fabrication parameters and/or structural parameters can result in the performance or fabrication optimizations getting stuck in a local minimum 301 while there is an even better structural/fabrication configuration that can result in further reduction of the performance loss value 121 at local minimum 302. However, the optimization algorithm may not be able to reach local minimum 302 from local minimum 301 without adjusting the weighting coefficients (e.g., combining weights) and/or the order in which those weights are ramped on. Accordingly, in some embodiments, the weights applied to combine loss values (e.g., structure gradients) output from design model 110 with structural gradients from fabrication loss function 115 may be adjusted and/or the order of ramping on these weights between optimization iterations may be adjusted to explore other regions of optimization curve 300 (process block 265).

If exploration of the optimization landscape is complete, or not executed, then process 200 continues to a process block 270 where a revised fabrication specification 175 is output after the final iteration of fabrication optimizer 125.

Process 200 illustrated in FIG. 2 describes a serial end-to-end evaluation architecture between fabrication model 105 and design model 110. However, these models may also be executed in parallel, isolation, or alternating fashion to perform linked, but separate parallel optimizations as opposed to strictly end-to-end serial optimizations for each iteration. For example, design model 110 may execute iterations of the performance optimization loop 101, as discussed above, based upon an initial structural design 140, obtained from fabrication model 105. The performance gradients calculated by design model 110 as a byproduct of the adjoint simulation may be used by structural optimizer 158 to revise the structural parameters of the initial structural design and output a revised structural design 160, which is then seeded back into design model 110 for the next iteration of performance optimization loop 101.

Performance optimization loop 101 may be iterated in parallel, isolation, and/or alternating fashion for a number of iterations until revised structural design 160 converges, or converges within a specified threshold. At such point, structural gradients are ultimately cascaded back to fabrication model 105 either directly (via paths A and C), or indirectly via fabrication loss function 115 (via paths A, D, E, F, and B). The indirect path includes fabrication loss function 115 comparing a revised structural design 160 against a target structural design 165 to generate structural design error 171. After a crosspollination (e.g., exchange of gradients or other outputs between models), fabrication model 105 may then perform a series of fabrication optimization loops 102 that are iterated in parallel and/or isolation from the performance optimization loop 101.

Fabrication loss function 115 along with performance loss function 120 may be thought of as components of a total loss function 124. Similarly, fabrication loss value 116 and performance loss value 112 may be viewed as contributions to a total loss value 123. Fabrication model 105 and design model 110 may be used to perform parallel or alternating forward simulations and/or backpropagations to optimize their individual contributions to the total loss value 123. The inputs and/or outputs of these parallel optimization loops may be periodically (or on-demand) crosspollinated/cascaded between the models.

Figure 4:
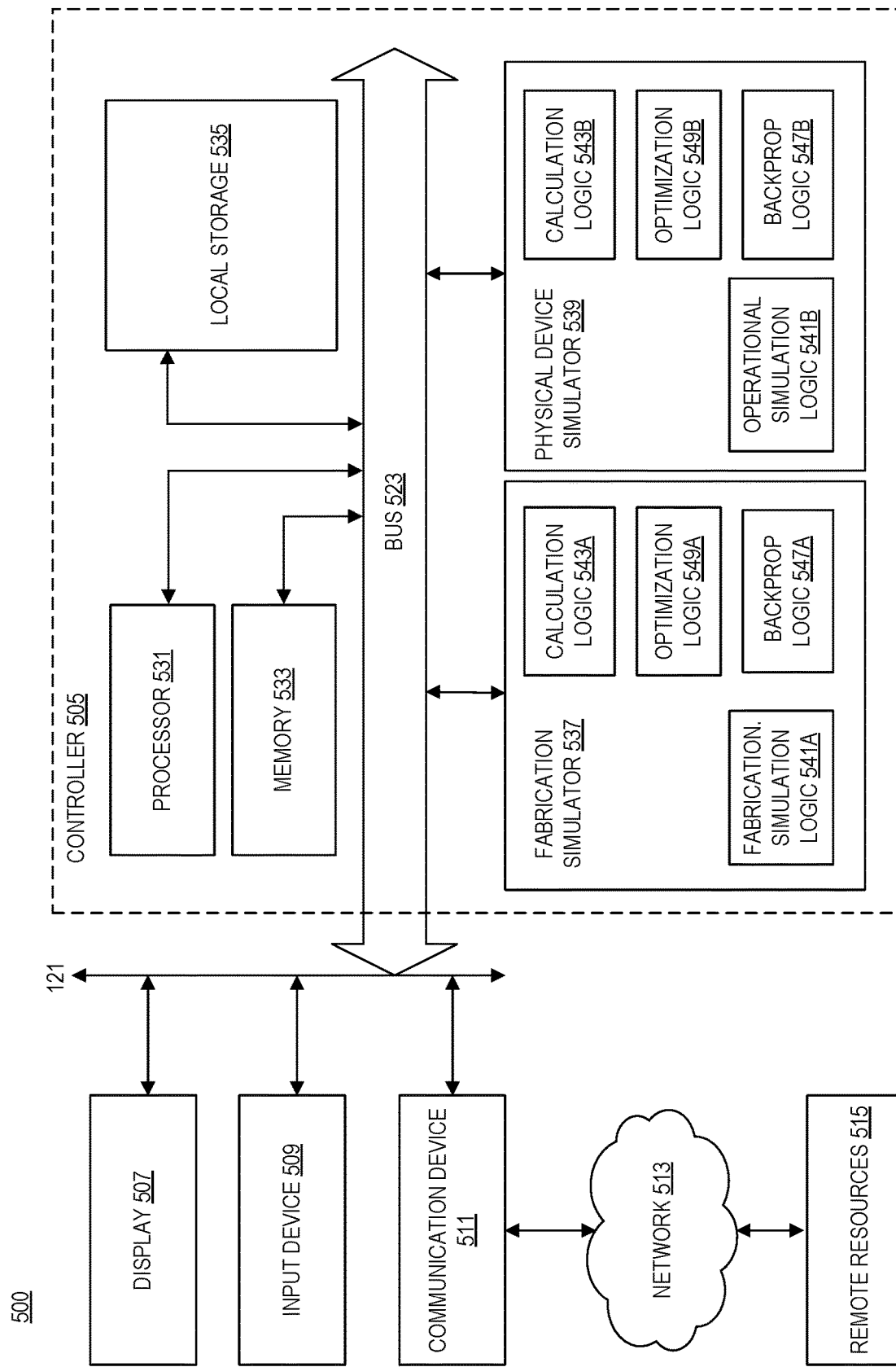
FIG. 4 is a functional block diagram of a computing system for simulating and optimizing the fabrication and operation of a physical device, in accordance with an embodiment of the disclosure.

FIG. 4 is a functional block diagram of a computing system 500 for simulating and optimizing the fabrication and operation of the physical device, in accordance with an embodiment of the disclosure. The illustrated embodiment of system 500 includes a controller 505, a display 507, input device(s) 509, communication device(s) 511, network 513, remote resources 515, a bus 521, and a bus 523. The illustrated embodiment of controller 105 includes processor 531, memory 533, local storage 535, a fabrication simulator 537, and a physical device simulator 539. The illustrated embodiment of fabrication simulator 537 includes fabrication simulation logic 541A, backpropagation logic 547A, optimization logic 549A, and calculation logic 543A. Correspondingly, the illustrated embodiment of physical device simulator 539 includes operational simulation logic 541B, backpropagation logic 547B, optimization logic 549B, and calculation logic 543B. It is appreciated that in some embodiments, controller 505 may be a distributed system. Furthermore, system 500 is merely one demonstrative system architecture, and other device architectures may be used.

Controller 505 is coupled to display 507 via buses 521 and 523 for displaying information to a user of system 500. Input device 509 is coupled to bus 523 through bus 521 for communicating information and command selections to processor 531. Input device 509 may include a mouse, trackball, keyboard, stylus, or other computer peripheral, to facilitate an interaction between the user and controller 505. In response, controller 505 may provide verification of the interaction through display 507.

Communication device 511 is provided for accessing remote resources 515 of a distributed system via network 513. Communication device 511 may include any of a number of networking peripheral devices such as those used for coupling to an Ethernet, token ring, Internet, a wide area network, or otherwise. Communication device 511 may further include a null-modem connection, or any other mechanism that provides connectivity between controller 505 and the outside world. Note that any or all of the components of system 500 illustrated in FIG. 5 and associated hardware may be used in various embodiments of the present disclosure. The remote resources 515 may be part of a distributed system and include any number of processors, memory, and other resources for optimizing the structural parameters of a physical device being simulated.

The controller 505 orchestrates the operation of the system 500 for optimizing fabrication parameters and/or structural (e.g., physical) parameters of the physical device. Processor 531 (e.g., one or more central processing units, graphics processing units, and/or tensor processing units, etc.), memory 533 (e.g., volatile memory such as DRAM and SRAM, non-volatile memory such as ROM, flash memory, and the like), local storage 535 (e.g., magnetic memory such as computer disk drives), and the simulators 537 and 539 are coupled to each other through bus 523. Controller 505 includes software logic (e.g., instructions included in memory 533) and/or hardware logic (e.g., application specific integrated circuits, field-programmable gate arrays, and the like) that when executed by controller 505 causes controller 505 or system 500 to perform operations. The operations may be based on instructions stored within any one of, or a combination of, memory 533, local storage 535, fabrication simulator 537, physical device simulator 539, and remote resources 515 accessed through network 513.

In one embodiment, fabrication simulator 537 represents a software architecture that is stored within memory 533 or local storage 535 and executed by processor 531 to execute fabrication model 105. Fabrication simulation logic 541A includes the logic for performing the forward fabrication simulation, optimization logic 549A performs the functionality described in connection with fabrication optimizer 125, and backprop logic 547A includes the logic for performing the fabrication backpropagation, while calculation logic 543A includes the logic to execute fabrication loss function 115. Correspondingly, in one embodiment, operational simulation logic 541B includes the logic for performing the forward operational simulation, optimization logic 549B performs the functionality described in connection with structural optimizer 158, and backprop logic 547B includes the logic for performing the adjoint operational simulation, while calculation logic 543B includes the logic to execute performance loss function 120.

Figure 5A:
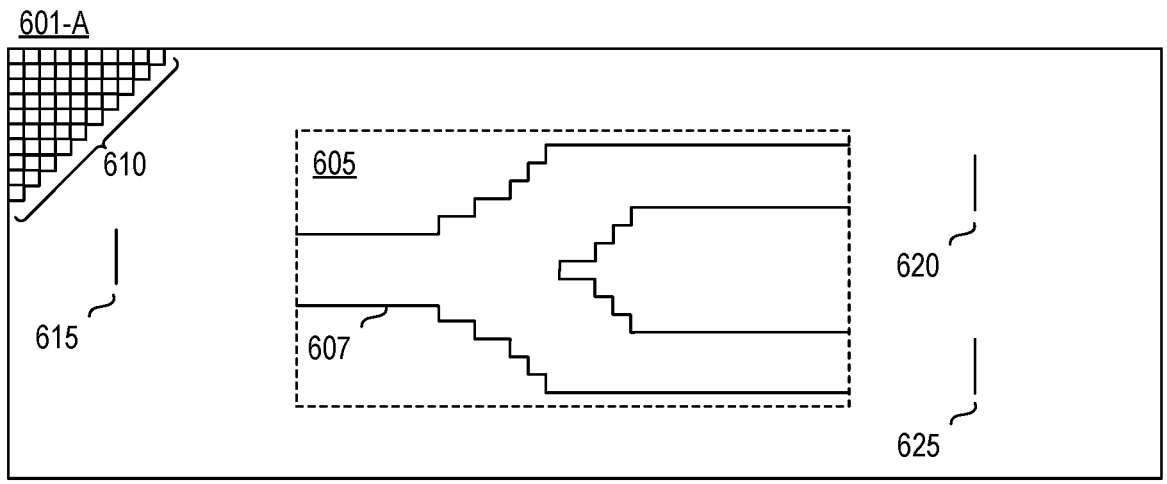
FIG. 5A illustrates a demonstrative simulated environment for simulating the operation of a physical device, in accordance with an embodiment of the disclosure.
Figure 5B:
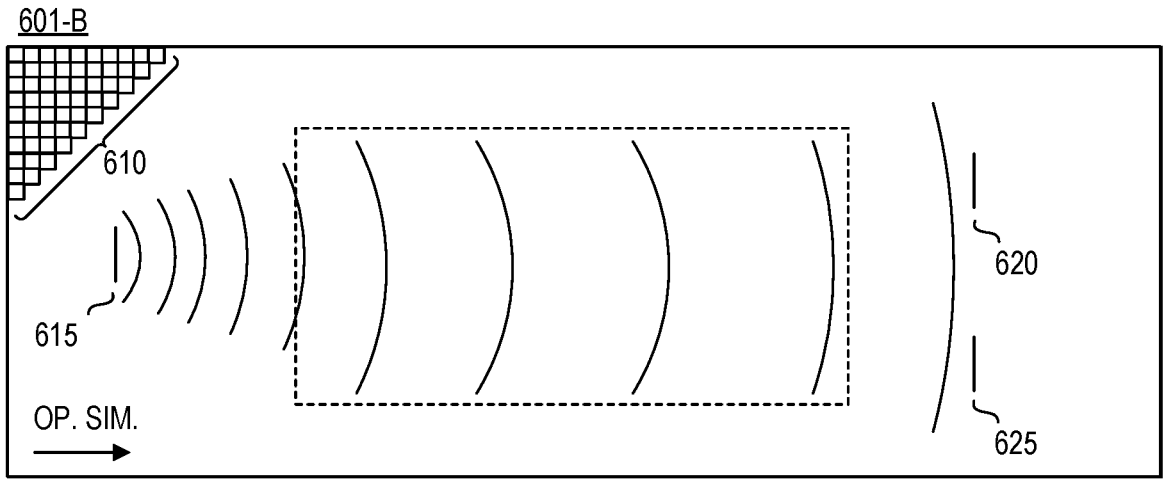
FIG. 5B illustrates an operational simulation of a physical device, in accordance with an embodiment of the disclosure.
Figure 5C:
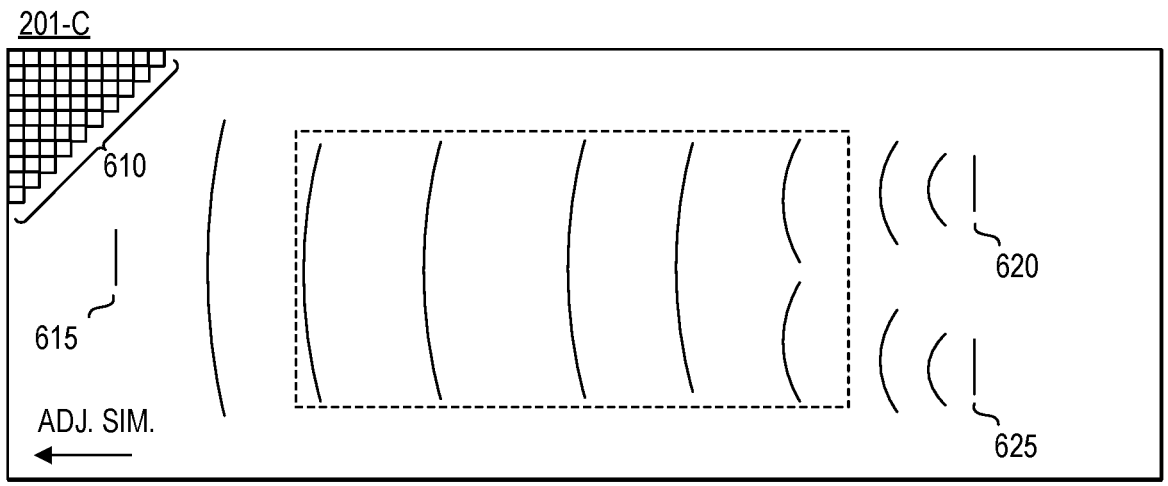
FIG. 5C illustrates an adjoint simulation (backpropagation) of a performance loss error through the simulated environment, in accordance with an embodiment of the disclosure.
Figure 6A:
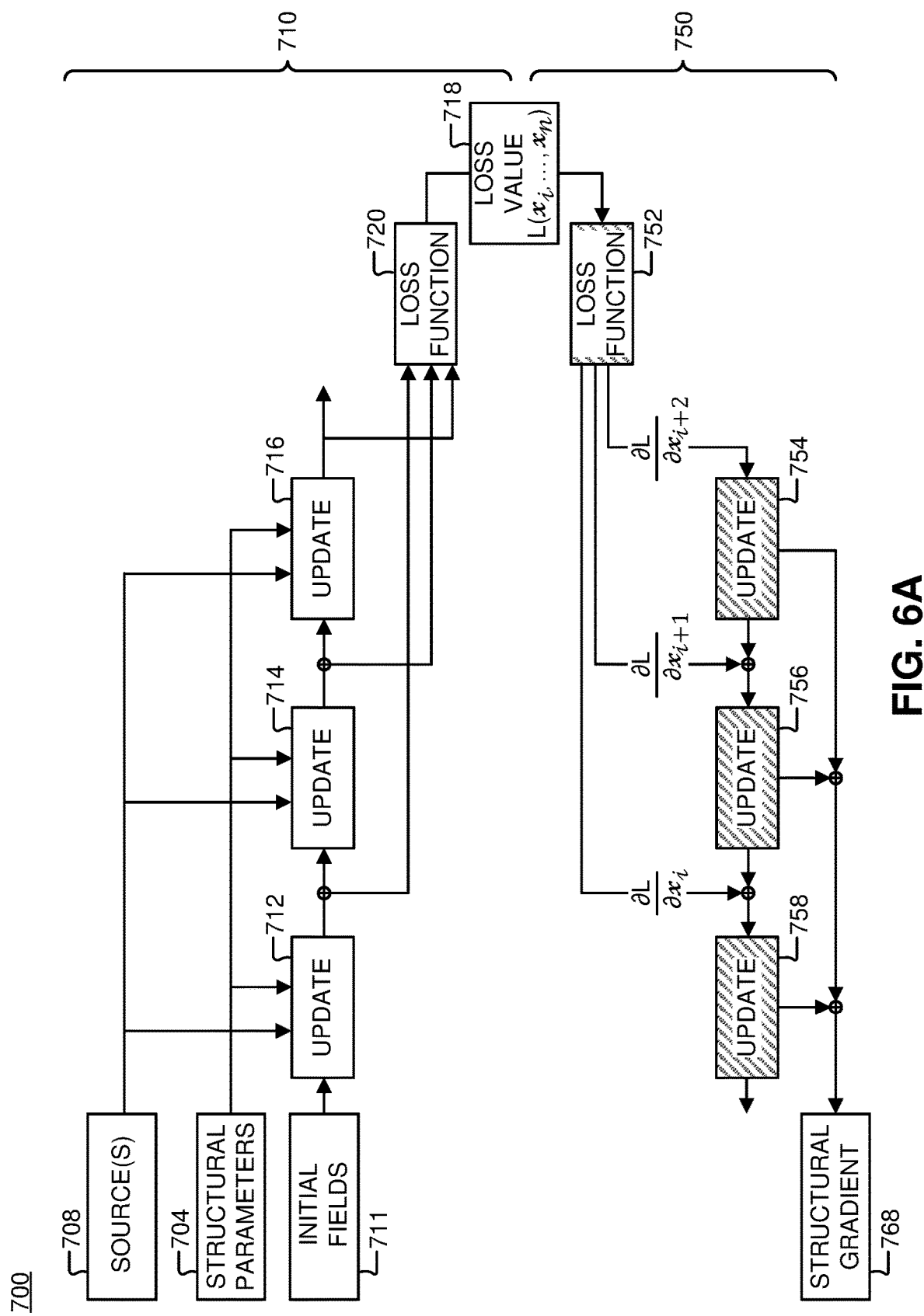
FIG. 6A is a flow chart illustrating example time steps for the operational and adjoint simulations, in accordance with an embodiment of the disclosure.
Figure 6B:
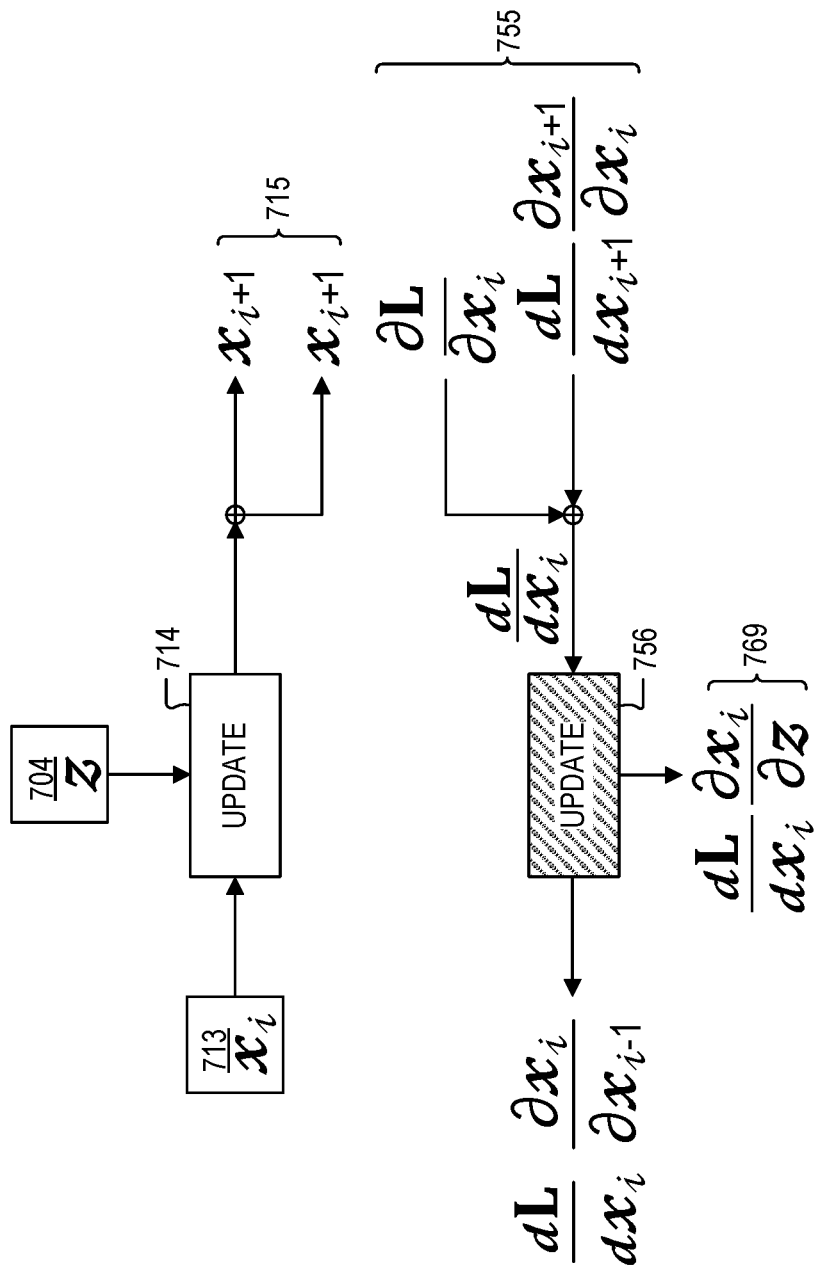
FIG. 6B is a flow chart illustrating a relationship between an operational simulation and the backpropagation, in accordance with an embodiment of the disclosure.

FIGS. 5A-5C illustrate an initial setup, an operational simulation, and a adjoint simulation of a simulated environment 601, respectively, for optimizing structural parameters of a physical device with design model 110, in accordance with an embodiment. The simulated environment 601 and corresponding initial setup, operational simulation, adjoint simulation, and structural parameter optimization may be achieved via a physics simulator such as that described above. As illustrated in FIGS. 6A-6C, the simulated environment is represented in two-dimensions, however it is appreciated that higher (e.g., 3-dimensional space) and lower (e.g., 1-dimensional space) dimensionality may also be used to describe the simulated environment 601 and the physical device. In some embodiments, the optimization of the structural parameters of the physical device illustrated in FIGS. 5A-5C may be achieved via, inter alia, simulations (e.g., time-forward and backpropagation) that utilize a FDTD method to model the field responses (e.g., both electric and magnetic).

FIG. 5A illustrates an example rendering of a simulated environment 601-A describing an electromagnetic device, in accordance with an embodiment of the present disclosure. The simulated environment 601-A represents the simulated environment 601 at an initial time step (e.g., an initial set up) for optimizing structural parameters of the physical device. The physical device described by the simulated environment 601 may correspond to an optical waveguide having a designable region 605 in which the structural parameters of the simulated environment may be designed, modified, or otherwise changed. The simulated environment 601 includes an excitation source 615 (e.g., a gaussian pulse, a wave, a waveguide mode response, and the like). The electrical and magnetic fields (e.g., field response) within the simulated environment 601 (and the physical device) may change in response to the excitation source 615. The specific settings of the initial structural parameters, excitation source, performance parameters, and other metrics (i.e., initial description) for a first-principles simulation of a physical device are input before the operational simulation starts.

As illustrated, the simulated environment 601 (and subsequently the physical device) is described by a plurality of voxels 610, which represent individual elements of the two-dimensional (or three-dimensional) space of the simulated environment. Each of the voxels is illustrated as two-dimensional squares, however it is appreciated that the voxels may be represented as cubes or other shapes in three-dimensional space. It is appreciated that the specific shape and dimensionality of the plurality of voxels 610 may be adjusted dependent on the simulated environment 601. It is further noted that only a portion of the plurality of voxels 610 are illustrated to avoid obscuring other aspects of the simulated environment 601. Each of the plurality of voxels 610 is associated with one or more structural parameters, a field value to describe a field response, and a source value to describe the excitation source at a specific position within the simulated environment 601. The field response, for example, may correspond to a vector describing the electric and/or magnetic field at a particular time step for each of the plurality of voxels 610. More specifically, the vector may correspond to a Yee lattice that discretizes Maxwell's equations for determining the field response. In some embodiments, the field response is based, at least in part, on the structural parameters and the excitation source 615.

FIG. 5B illustrates an example operational simulation of the simulated environment 601-B at a particular time step in which the excitation source 615 is active (e.g., generating waves originating at the excitation source 615 that propagate through the simulated environment 601). In one embodiment, the physical device is an optical waveguide operating at the frequency of interest and having a particular waveguide mode (e.g., transverse electromagnetic mode, transverse electric mode, etc.) and the excitation source is at an input of the optical waveguide having a specified spatial, phase, and temporal profile. The operational simulation occurs over a plurality of time steps, including the illustrated time step. When performing the operational simulation, changes to the field response (e.g., the field value) for each of the plurality of voxels 610 are updated in response to the excitation source 615 and based, at least in part, on the structural parameters of the physical device at each of the plurality of time steps. Similarly, in some embodiments the source value is updated for each of the plurality of voxels (e.g., in response to the electromagnetic waves from the excitation source 615 propagating through the simulated environment). It is appreciated that the operational simulation is incremental and that the field value (and source value) is updated incrementally at each time step as time moves forward for each of the plurality of time steps. It is further noted that in some embodiments, the update is an iterative process and that the update of each field and source value is based, at least in part, on the previous update of each field and source value.

When performing the operational simulation, performance loss function 120 may be computed at each output port 620 and 625 based, at least in part, on a comparison (e.g., mean squared difference) between the field response (simulated performance parameters 145) and a desired field response (target performance parameters 150) at a designated time step (e.g. a final time step of the operational simulation). Performance loss value 121 may be described in terms of a specific performance value (e.g., power in a specific waveguide mode). Structural parameters may be optimized for this specific performance value.

FIG. 5C illustrates an example backpropagation of performance loss error 155 backwards within the simulated environment 601-C describing the physical device, in accordance with an embodiment of the present disclosure. In one embodiment, the adjoint performance simulation injects performance loss error 155 at output ports 620 and 625 as a sort of reverse excitation source for stimulating a reverse field response through voxels 610 of simulated environment 601-C. The adjoint performance simulation of performance loss error 155 determines an influence that changes in the structural parameters of voxels 610 have on performance loss value 121.

FIG. 6A is a flow chart 700 illustrating example time steps for a time-forward simulation 710 and backpropagation 750 within a simulated environment, in accordance with an embodiment of the present disclosure. Flow chart 700 is one possible implementation that a system (e.g., design model 110) may use to perform a forward operational simulation 710 and backpropagation 750 of a simulated environment. In the illustrated embodiment, the forward operational simulation utilizes a FDTD method to model the field response (both electric and magnetic) at a plurality of time steps in response to an excitation source. More specifically, the time-dependent Maxwell's equations (in partial differential form) are discretized to solve for field vector components (e.g. the field response of each of the plurality of voxels 610 of the simulated environment 601 in FIGS. 5A-5C) over a plurality of time steps.

As illustrated in FIG. 6A, the flow chart 700 includes update operations for a portion of operational simulation 710 and adjoint simulation 750. Operational simulation 710 occurs over a plurality of time-steps (e.g., from an initial time step to a final time step over a pre-determined or conditional number of time steps having a specified time step size) and models changes (e.g., from the initial field values 711) in electric and magnetic fields of a plurality of voxels describing the simulated environment and/or physical device that collectively correspond to the field response. More specifically, update operations (e.g., 712, 714, and 716) are iterative and based on the field response, structural parameters 704, and one or more physical stimuli sources 708. Each update operation is succeeded by another update operation, which are representative of successive steps forward in time within the plurality of time steps. For example, update operation 714 updates the field values 713 (see, e.g., FIG. 6B) based on the field response determined from the previous update operation 712, sources 708, and the structural parameters 704. Similarly, update operation 716 updates the field values 715 (see, e.g., FIG. 6B) based on the field response determined from update operation 714. In other words, at each time step of the operational simulation the field values (and thus field response) are updated based on the previous field response and structural parameters of the physical device. Once the final time step of the operational simulation 710 is performed, the loss value 718 may be determined (e.g., based on a pre-determined loss function 720). The loss gradients determined from block 752 may be treated as adjoint or virtual sources (e.g., physical stimuli or excitation source originating at an output region) which are backpropagated in reverse (from the final time step incrementally through the plurality of time steps until reaching the initial time step) to determine structural gradient 768.

In the illustrated embodiment, the FDTD solve (e.g., time-forward simulation 710) and backpropagation 750 problem are described pictorially, from a high-level, using only "update" and "loss" operations as well as their corresponding gradient operations. The simulation is set up initially in which the structure parameters, the excitation source, and the initial field states of the simulated environment (and electromagnetic device) are provided. As discussed previously, the field states are updated in response to the excitation source based on the structural parameters. More specifically, the update operation is given by $\phi$, where $x_{i+1} = \phi(x_i, b_i, z)$ for $i = 1, \ldots n$. Here, $n$ corresponds to the total number of time steps (e.g., the plurality of time steps) for the time-forward simulation, $x_i$ corresponds to the field response (the field value associated with the electric and magnetic fields of each of the plurality of voxels) of the simulated environment at time step $i$, $b_i$ corresponds to the excitation source(s) (the source value associated with the electric and magnetic fields for each of the plurality of voxels) of the simulated environment at time step $i$, and $z$ corresponds to the structural parameters describing the topology and/or material properties of the electromagnetic device.

It is noted that using the FDTD method, the update operation can specifically be stated as:

$$\phi(x_i, z, z) = A(z) x_i + B(z) z. \quad (1)$$

That is to say the FDTD update is linear with respect to the field and source terms. Concretely, $A(z) \in \mathbb{R}^{N \times N}$ and $B(z) \in \mathbb{R}^{N \times N}$ are linear operators which depend on the structure parameters, $z$, and act on the fields, $x_i$, and the sources, $z$, respectively. Here, it is assumed that $x_i, z \in \mathbb{R}^N$ where N is the number of FDTD field components in the time-forward simulation. Additionally, the loss operation is given by $L = (x_i, \ldots, x_n)$, which takes as input the computed fields and produces a single, real-valued scalar (e.g., the loss value) that can be reduced and/or minimized.

In terms of revising or otherwise optimizing the structural parameters of the electromagnetic device, the relevant quantity to produce is $$\frac{dL}{dz},$$

which is used to describe the change in the loss value with respect to a change in the structural parameters of the electromagnetic device and is denoted as the "structural gradient" illustrated in FIG. 6A.

FIG. 6B is a chart 780 illustrating the relationship between the update operation for the operational simulation and the adjoint simulation (e.g., backpropagation), in accordance with an embodiment of the present disclosure. More specifically, FIG. 6B summarizes the operational and adjoint simulation relationships that are involved in computing the structural gradient, $$\frac{dL}{dz},$$

which include $$\frac{\partial L}{\partial x_i}, \frac{\partial x_{i+1}}{\partial x_i}, \frac{dL}{dx_i}, \text{ and } \frac{\partial x_i}{\partial z}.$$

The update operation 714 of the operational simulation updates the field values 713, $x_i$, of the plurality of voxels at the $i$th time step to the next time step (i.e., $i+1$ time step), which correspond to the field values 715, $x_{i+1}$. The gradients 755 are utilized to determine $$\frac{dL}{dx_i}$$

for the backpropagation (e.g., update operation 756 backwards in time), which combined with the gradients 769 are used, at least in part, to calculate the structural gradient, $$\frac{dL}{dz} \cdot \frac{\partial L}{\partial x_i}$$

is the contribution of each field to the loss value, L. It is noted that this is the partial derivative, and therefore does not take into account the causal relationship of $x_i \rightarrow x_{i+1}$. Thus, $$\frac{\partial x_{i+1}}{\partial x_i}$$

is utilized which encompasses the $x_i \rightarrow x_{i+1}$ relationship. The loss gradient, $$\frac{dL}{dx_i}$$

may also be used to compute the structural gradient, $$\frac{dL}{dz},$$

and corresponds to the total derivative of the field with respect to loss value, L. The loss gradient, $$\frac{dL}{dx_i},$$

at a particular time step, $i$ is equal to the summation of $$\frac{\partial L}{\partial x_i} + \frac{dL}{dx_{i+1}} \frac{\partial x_{i+1}}{\partial x_i}.$$

Finally, $$\frac{\partial x_i}{\partial z},$$

which corresponds to the field gradient, is used which is the contribution to $$\frac{dL}{dz}$$

from each time/update step.

$$\frac{dL}{dz}$$

is given by:

$$\frac{dL}{dz} = \sum_i \frac{dL}{dx_i} \frac{\partial x_i}{\partial z}. \quad (2)$$

For completeness, the full form of the first time in the sum, $$\frac{dL}{dz},$$

is expressed as:

$$\frac{dL}{dx_i} = \frac{\partial L}{\partial x_i} + \frac{dL}{dx_{i+1}} \frac{\partial x_{i+1}}{\partial x_i}. \quad (3)$$

Based on the definition of $\phi$ as described by equation (1), it is noted that $$\frac{\partial x_{i+1}}{\partial x_i} = A(z),$$

which can be substituted in equation (3) to arrive at an adjoint update for backpropagation (e.g., the update operations such as update operation 756), which can be expressed as:

$$\frac{dL}{dx_i} = \frac{\partial L}{\partial x_i} + \frac{dL}{dx_{i+1}} A(z), \quad (4)$$

or $$\nabla_{x_i} L = A(z)^T \nabla_{x_{i+1}} L + \frac{\partial L^T}{\partial x_i}. \quad (5)$$

The adjoint update is the backpropagation of the loss gradients from later to earlier time steps and may be referred to as a backwards solve for $$\frac{dL}{dx_i}.$$

The second term in the sum of the structural gradient, $$\frac{dL}{dz},$$

is denoted as:

$$\frac{\partial x_i}{\partial z} = \frac{d\phi(x_{i-1}, \boldsymbol{b}_{i-1}, z)}{dz} = \frac{dA(z)}{dz}x_{i-1} + \frac{dB(z)}{dz}\boldsymbol{b}_{i-1}, \quad (6)$$

for the particular form of φ described by equation (1).

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. At least one non-transitory machine-accessible storage medium that provides instructions that, when executed by a machine, will cause the machine to perform operations comprising:
   executing a fabrication simulation of a physical device with a fabrication model that receives a fabrication specification as input and outputs a structural design for the physical device in response to the fabrication simulation, wherein the fabrication simulation simulates fabrication steps for making the physical device;
   executing an operational simulation of the physical device with a design model that simulates a field response propagating through a simulated environment of the physical device;
   forward cascading the structural design output from the fabrication model to the design model to establish the simulated environment for the operational simulation;
   backpropagating a performance loss error through the design model, the performance loss error generated based upon a performance loss function used to determine a performance loss value;
   reverse cascading an output from the backpropagating of the performance loss error to the fabrication model;
   backpropagating a structural design error through the fabrication model to generate one or more first gradients, wherein the structural design error is generated based on the output from the backpropagating of the performance loss error through the design model; and
   revising the fabrication specification, based upon the one or more first gradients to generate and output a revised fabrication specification for use by a fabrication process of the physical device,
   wherein the physical device comprises a photonic or electromagnetic device.

2. The at least one non-transitory machine-accessible storage medium of claim 1, wherein the output from the backpropagating of the performance loss error comprises one or more second gradients output from the design model, wherein the second gradients are generated in response to the backpropagating of the performance loss error, wherein the structural design error is based on the second gradients, and wherein the fabrication specification is revised to reduce at least the performance loss value.

3. The at least one non-transitory machine-accessible storage medium of claim 2, wherein the structural design error comprises the second gradients output from the design model and wherein the second gradients comprise sensitivity measures on the performance loss value to structural changes in the physical device.

4. The at least one non-transitory machine-accessible storage medium of claim 2, further providing instructions that, when executed by the machine, will cause the machine to perform further operations, comprising:
   performing a gradient descent algorithm using the second gradients to revise the structural design and output a revised structural design; and
   generating the structural design error with a fabrication loss function that compares the revised structural design to a target structural design.

5. The at least one non-transitory machine-accessible storage medium of claim 4, wherein the fabrication loss function includes a penalty measure associated with one or more of a yield measure when fabricating the physical device, a cost measure when fabricating the physical device, or a time measure when fabricating the physical device.

6. The at least one non-transitory machine-accessible storage medium of claim 2, further providing instructions that, when executed by the machine, will cause the machine to perform further operations, comprising:
   iterating executing the fabricating model, executing the design model, backpropagating the performance loss error, and backpropagating the structural design error; and
   revising the fabrication specification between each iteration using a gradient descent algorithm.

7. The at least one non-transitory machine-accessible storage medium of claim 2, wherein revising the fabrication specification comprises updating a fabrication step of the physical device that optimizes a fabrication parameter of the fabrication simulation, wherein the first gradients represent sensitivity measures of the fabrication step on a fabrication loss value generated from a fabrication loss function.

8. The at least one non-transitory machine-accessible storage medium of claim 7, further comprising:
generating the structural design error as a weighted combination of first contributions from a fabrication loss function and second contributions from the second gradients output from the design model.

9. The at least one non-transitory machine-accessible storage medium of claim 8, further providing instructions that, when executed by the machine, will cause the machine to perform further operations, comprising:
adjusting weights of the weighted combination between selected iterations of executing the fabricating model, executing the design model, backpropagating the performance loss error, and backpropagating the structural design error.

10. The at least one non-transitory machine-accessible storage medium of claim 1, wherein the simulated environment comprises an array of voxels that each describe one or more structural parameters of the physical device in a corresponding location in a N dimensional space, and wherein executing the operational simulation with the design model comprises simulating the field response propagating through the simulated environment in response to an excitation source and interacting with the voxels, wherein the field response is influenced by the structural parameters.

11. The at least one non-transitory machine-accessible storage medium of claim 1, wherein the fabrication model comprises a differentiable characterization of a real fabrication process of the physical device and the design model comprises a differentiable characterization of operation of the physical device.

12. The at least one non-transitory machine-accessible storage medium of claim 1, further providing instructions that, when executed by the machine, will cause the machine to perform further operations, comprising:
computing the field response at an output of the physical device;
generating a simulated performance parameter based upon the field response at the output of the physical device; and
generating the performance loss error based upon the performance loss function that compares the simulated performance parameter to a target performance parameter.

13. The at least one non-transitory machine-accessible storage medium of claim 1, wherein backpropagating the performance loss error comprises backpropagating a loss gradient.

14. The at least one non-transitory machine-accessible storage medium of claim 1, wherein executing the fabrication simulation of the physical device with the fabrication model comprises simulating one or more manufacturing processes.

15. A computer-implemented method of optimizing fabrication steps for fabricating a physical device, the method comprising:
executing a fabrication simulation of the physical device with a fabrication model that receives a fabrication specification as input and outputs a structural design for the physical device in response to the fabrication simulation, wherein the fabrication simulation simulates fabrication steps for making the physical device;
executing an operational simulation of the physical device with a design model that simulates a field response propagating through a simulated environment of the physical device;
forward cascading the structural design output from the fabrication model to the design model to establish the simulated environment for the operational simulation;
backpropagating a performance loss error through the design model, the performance loss error generated based upon a performance loss function used to determine a performance loss value;
reverse cascading an output from the backpropagating of the performance loss error to the fabrication model;
backpropagating a structural design error through the fabrication model to generate one or more first gradients, wherein the structural design error is generated based on the output from the backpropagating of the performance loss error through the design model; and
revising the fabrication specification, based upon the one or more first gradients to generate and output a revised fabrication specification for use by a fabrication process of the physical device,
wherein the physical device comprises a photonic or electromagnetic device.

16. The computer-implemented method of claim 15, wherein the output from the backpropagating of the performance loss error comprises one or more second gradients output from the design model, wherein the second gradients are generated in response to the backpropagating of the performance loss error, wherein the structural design error is based on the second gradients, and wherein the fabrication specification is revised to reduce at least the performance loss error.

17. The computer-implemented method of claim 16, wherein the structural design error comprises the second gradients output from the design model and wherein the second gradients comprise sensitivity measures on the performance loss value to structural changes in the physical device.

18. The computer-implemented method of claim 16, further comprising:
performing a gradient descent algorithm using the second gradients to revise the structural design and generate a revised structural design; and
generating the structural design error with a fabrication loss function that compares the revised structural design to a target structural design.

19. The computer-implemented method of claim 18, wherein the fabrication loss function includes a penalty measure associated with one or more of a yield measure when fabricating the physical device, a cost measure when fabricating the physical device, or a time measure when fabricating the physical device.

20. The computer-implemented method of claim 16, further comprising:
iteratively executing the fabricating model, executing the design model, backpropagating the performance loss error, and backpropagating the structural design error; and
revising the fabrication specification between each iteration via a gradient descent algorithm.

21. The computer-implemented method of claim 16, wherein revising the fabrication specification comprises updating a fabrication step of the physical device that optimizes a fabrication parameter of the fabrication simulation, wherein the first gradients represent sensitivity measures of the fabrication step on a fabrication loss value generated from a fabrication loss function.

22. The computer-implemented method of claim 21, further comprising:
  generating the structural design error as a weighted combination of first contributions from a fabrication loss function and second contributions from the second gradients output from the design model.

23. The computer-implemented method of claim 22, further comprising:
  adjusting weights of the weighted combination between selected iterations of executing the fabrication model, executing the design model, backpropagating the performance loss error, and backpropagating the structural design error.

24. The computer-implemented method of claim 15, wherein the fabrication model comprises a differentiable characterization of a real fabrication process of the physical device and the design model comprises a differentiable characterization of operation of the physical device.

25. The computer-implemented method of claim 15, wherein the fabrication simulation and the operational simulation are executed in iterative parallel loops that selectively forward cascade the structural design to the design mode and selectively reverse cascade the output to the fabrication model between selective iterations of the fabrication simulation and the operational simulation.

* * * * *